(12) United States Patent
Takagi

(10) Patent No.: US 7,264,573 B2
(45) Date of Patent: Sep. 4, 2007

(54) AUTOMATIC TRANSMISSION CONTROL APPARATUS HAVING DIAGNOSTIC FUNCTION

(75) Inventor: Akira Takagi, Obu (JP)

(73) Assignee: Denso Corporation (JP)

( * ) Notice: Subject to any disclaimer, the term of this patent is extended or adjusted under 35 U.S.C. 154(b) by 259 days.

(21) Appl. No.: 11/074,844

(22) Filed: Mar. 9, 2005

(65) Prior Publication Data

US 2005/0221954 A1 Oct. 6, 2005

(30) Foreign Application Priority Data

Mar. 31, 2004 (JP) ............... 2004-105561

(51) Int. Cl.
*F16H 61/26* (2006.01)

(52) U.S. Cl. ............ 477/156; 477/906; 192/3.58; 73/168

(58) Field of Classification Search ............ 477/156, 477/906; 475/116, 119; 192/3.57, 3.58, 192/3.61; 137/552; 73/168

See application file for complete search history.

(56) References Cited

U.S. PATENT DOCUMENTS

| 5,643,123 | A  | * | 7/1997 | Jang et al. | ............ 475/119 |
| 6,357,289 | B1 | * | 3/2002 | Futawatari | ............ 73/118.1 |
| 6,375,591 | B1 |   | 4/2002 | Wakahara et al. | |

* cited by examiner

*Primary Examiner*—David D. Le
(74) *Attorney, Agent, or Firm*—Nixon & Vanderhye PC

(57) ABSTRACT

An automatic transmission control apparatus controls a gear position by engaging and disengaging multiple frictional elements. A hydraulic pressure detector detects hydraulic pressure applied to the frictional elements. A failure determiner determines a failure, i.e., a dual-engagement of the frictional elements in accordance with detection signals of the hydraulic pressure detector. The hydraulic pressure detector detects first and second hydraulic pressure applied to the plurality of frictional elements. The second hydraulic pressure is greater than the first hydraulic pressure. The failure determiner determines a failure in accordance with a detection signals of the first and second hydraulic pressure detected by the hydraulic pressure detector.

12 Claims, 5 Drawing Sheets

FIG. 3
|   | SW1 | SW2 | Vout/Vin |
|---|-----|-----|----------|
| 1 | OFF | OFF | 1 |
| 2 | ON  | OFF | R1/(R1+R3) |
| 3 | OFF | ON  | R2/(R2+R3) |
| 4 | ON  | ON  | [(R1R2(R1+R2)]/ [R1R2/(R1+R2)+R3] |
FIG. 4A
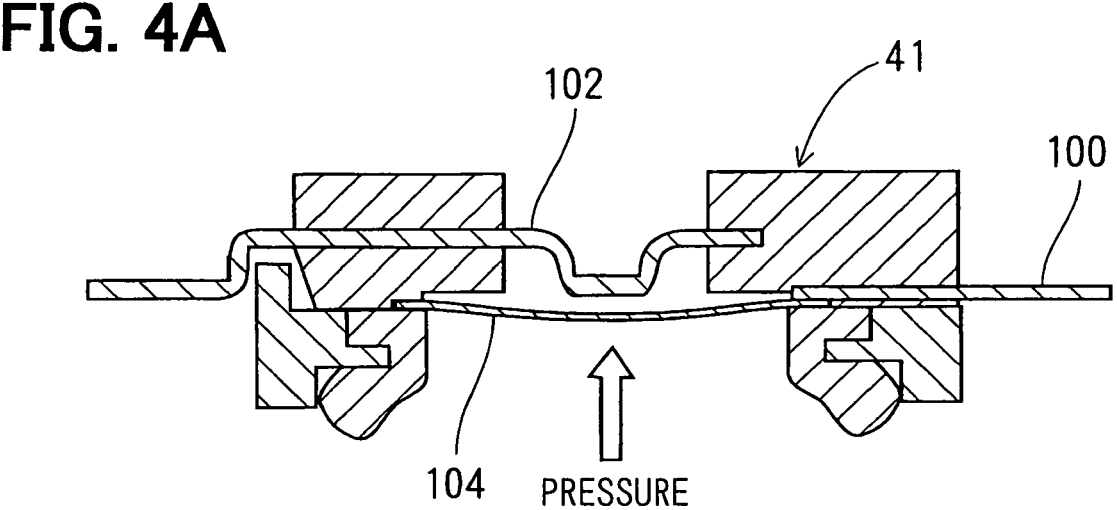
FIG. 4B
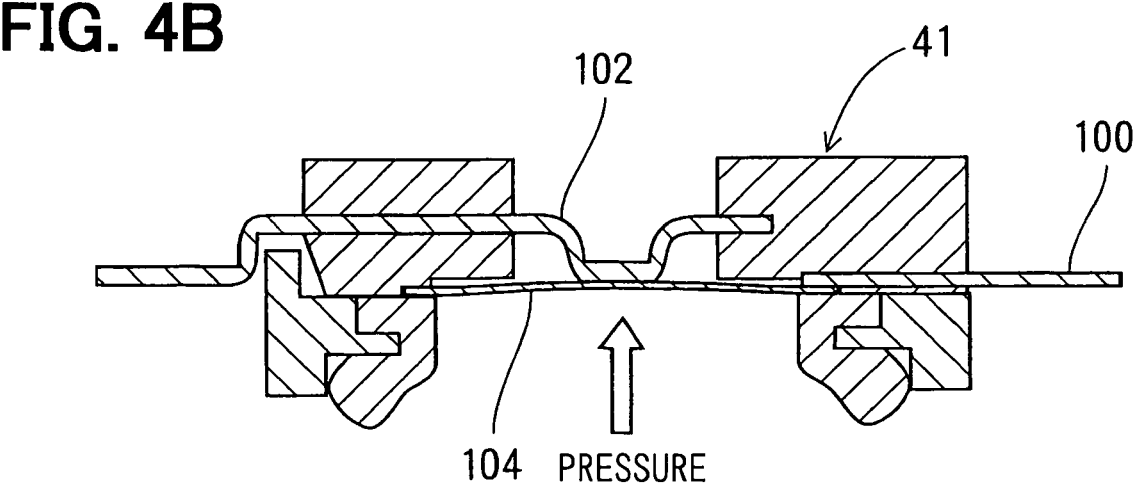

|   |   | L/C | H/C | 2-4/B | LR/B | R/C |
|---|---|---|---|---|---|---|
| P |   |   |   |   |   |   |
| R |   |   |   |   | ○ | ○ |
| N |   |   |   |   |   |   |
| D | 1 | ○ |   |   | (○) |   |
|   | 2 | ○ |   | ○ |   |   |
|   | 3 | ○ | ○ |   |   |   |
|   | 4 |   | ○ | ○ |   |   |

AUTOMATIC TRANSMISSION CONTROL APPARATUS HAVING DIAGNOSTIC FUNCTION

CROSS REFERENCE TO RELATED APPLICATIONS

This application is based on and incorporates herein by reference Japanese Patent Application No. 2004-105561 filed on March 31.

FIELD OF THE INVENTION

The present invention relates to an automatic transmission control apparatus that hydraulically controls a transmission mechanism of an automatic transmission.

BACKGROUND OF THE INVENTION

Conventionally, an automatic transmission is applied to an apparatus such as a vehicle. As disclosed in JP-A-2001-59570 (U.S. Pat. No. 6,357,289B1) and JP-A-2001-116134 (U.S. Pat. No. 6,375,591B1), a hydraulic control apparatus controls hydraulic pressure applied to frictional elements in an automatic transmission. Engagement and disengagement of each frictional element is controlled by the hydraulic control apparatus, so that a gear position is changed. Besides, hydraulic pressure, which is applied to each frictional element, is detected using a pressure switch, so that a failure is identified in accordance with a combination among detection signals of the pressure switches.

As shown in FIG. 7, one pressure switch detects hydraulic pressure applied to each frictional element in a hydraulic pressure control apparatus, in the same manners as those of the structures in U.S. Pat. No. 6,357,289B1 and U.S. Pat. No. 6,375,591B1.

Frictional elements include a reverse clutch (R/C) 1, a low-reverse brake (LR/B) 2, a low clutch (L/C) 3, a 2-4 brake (2-4/B) 4, and a high clutch (H/C) 5. The frictional elements are engaged, and disengaged in accordance with hydraulic pressure. Control means 11 to 15 respectively switch hydraulic pressure applied to the frictional elements 1 to 5. Each of the control means 11 to 15 is constructed of a solenoid valve and a spool valve, for example. The spool valve switches hydraulic passage in accordance with operation pressure of the solenoid valve. The manual valve 20 is connected with a select lever 30 via a wire or the like. The select lever 30 is operated by a driver to change a drive range (select lever position, gear position). When the drive range is changed, a manual valve 20 switches hydraulic pressure passages that are respectively connected to the control means 11 to 15. In this situation, hydraulic pressure, which is applied to each control means 11 to 15, is switched from one of line pressure and hydraulic pressure of a drain 22 to the other of the line pressure and the hydraulic pressure of the drain 22, in accordance with the drive range. Each of pressure switches 40 outputs detection signal of hydraulic pressure applied to each frictional element. The detection signal of the pressure switch 40 is an on/off signal that is switched on a threshold that is set at detection main pressure.

For example, a gear position is changed from the second gear to the third gear in the D range (drive range) in accordance with a table of engagement shown in FIG. 8. As shown in FIG. 9, when hydraulic pressure 204, 205 applied to the H/C 5 increases, the pressure switch 40, which detects the hydraulic pressure 204, 205 applied to the H/C 5, is turned ON, so that a dual-engagement can be detected. In FIG. 9, hydraulic pressure 205 applied to the H/C 5 increases faster than normal hydraulic pressure 204 applied to the H/C 5. Hydraulic pressure 200 is applied to L/C 3, and hydraulic pressure 202 is applied to the 2-4/B 4 that is disengaged.

However, in the structures disclosed in U.S. Pat. No. 6,357,289B1 and U.S. Pat. No. 6,375,591B1, one pressure switch 40 is provided to each frictional element 1 to 5, thereby, each pressure switch 40 can detect a condition of hydraulic pressure relative to one threshold. As shown in FIG. 10, when the 2-4/B 4 is not disengaged, hydraulic pressure 203 applied to the 2-4/B 4 is maintained high. In this case, when the threshold of the pressure switch 40 is set low, e.g., set at the first hydraulic pressure P1, a failure cannot be detected, or a dual-engagement may be detected after the dual-engagement arises.

Specifically, when hydraulic pressure applied to each frictional element 1 to 5 becomes greater than the first hydraulic pressure (low-threshold) P1 in FIGS. 9, 10, the frictional element engages. When at least two of the frictional elements simultaneously engage, a dual-engagement arises. The gear is changed on the point A in FIG. 10, and hydraulic pressure applied to the 2-4/B 4 is supposed to decrease as shown by the hydraulic pressure 202. When the threshold of the pressure switch 40 is set low, i.e., set at the first hydraulic pressure P1, disengagement of the 2-4/B 4 is detected on the point C in FIG. 10 by the pressure switch 40. In this case, if a failure arises, and the hydraulic pressure applied to the 2-4/B 4 is maintained high as shown by the hydraulic pressure 203, the hydraulic pressure 203 may be determined to be in a failure condition on the point C or later. That is, when the pressure switch 40 does not detect the hydraulic pressure 203 to be less than the first hydraulic pressure P1 on the point C or later, the hydraulic pressure 203 may be determined in the failure condition. Accordingly, the condition of the hydraulic pressure 203 may be determined at the point C or later after elapsing a long time from starting of the gear change on the point A. When the hydraulic pressure 203 applied to the 2-4/B 4 is maintained high, a dual-engagement arises on the point B in FIG. 10, on which the hydraulic pressure 204 applied to the H/C 5 increases over the first hydraulic pressure P1 so that the H/C 5 engages.

On the contrary, as referred to FIG. 9, when the threshold of the pressure switch 40 is set high at second hydraulic pressure P2, and the hydraulic pressure 205 applied to the H/C 5 increases faster than a predetermined speed, a dual-engagement cannot be detected even after the dual-engagement arises.

Specifically, the threshold of the pressure switch is set high, e.g., set at the second hydraulic pressure P2, and the hydraulic pressure 205 applied to the H/C 5 may increase faster than the predetermined speed. In this case, the hydraulic pressure 205 applied to the H/C 5 increases over the first hydraulic pressure P1 on the point B in FIG. 9, and the H/C 5 engages. Besides, the hydraulic pressure 202 applied to the 2-4/B 4 is still greater than the first hydraulic pressure P1 on the point B in FIG. 9, and the 2-4/B 4 still engages. That is, a dual engagement arises on the point B in FIG. 9. As time elapses, the hydraulic pressure 205 increases after passing the point B, and the hydraulic pressure 205 becomes greater than the second hydraulic pressure P2 on the point C in FIG. 9. At this point, increase of the hydraulic pressure 205 can be detected by the pressure switch 40. That is, the dual-engagement cannot be detected in the zone between the point B and the point C, when the threshold of the pressure switch is set high, e.g., set at the second hydraulic pressure P2.

Accordingly, when the pressure switch has only one threshold on either the low-pressure side or the high-pressure side for each frictional element, not only a dual-engagement but also a failure of hydraulic pressure cannot be detected on one of the engagement-side and the disengagement-side.

SUMMARY OF THE INVENTION

In view of the foregoing problems, it is an object of the present invention to produce an automatic transmission control apparatus that is capable of detecting a failure of hydraulic pressure, which is applied to frictional elements, on both sides of engagement and disengagement.

According to the present invention, an automatic transmission control apparatus controls a gear position by operating engagement and disengagement of multiple frictional elements. The automatic transmission control apparatus includes a hydraulic pressure detecting means and a failure determining means. The hydraulic pressure detecting means detects hydraulic pressure applied to at least one of the frictional elements. The failure determining means determines a failure in accordance with a detection signal of the hydraulic pressure detecting means.

The hydraulic pressure detecting means detects at least first hydraulic pressure and second hydraulic pressure. The second hydraulic pressure is greater than the first hydraulic pressure. The failure determining means determines a failure in accordance with a detection signal of the first hydraulic pressure that is detected by the hydraulic pressure detecting means. The failure determining means determines a failure in accordance with a detection signal of the second hydraulic pressure that is detected by the hydraulic pressure detecting means.

The hydraulic pressure detecting means detects hydraulic pressure that is applied to at least two of the frictional elements. The at least two of the frictional elements are probable of causing a dual-engagement. The failure determining means determines occurrence of the dual-engagement in accordance with the detection signal of the first hydraulic pressure that is detected by the hydraulic pressure detecting means. The failure determining means determines the dual-engagement in accordance with the detection signal of the second hydraulic pressure that is detected by the hydraulic pressure detecting means.

The dual-engagement arises when the at least two of the frictional elements simultaneously engage.

Each frictional element includes a return spring that generates resilient force biasing the frictional element in the direction in which the frictional element is released from an engagement condition. The frictional element engages when hydraulic pressure applied to the frictional element is greater than the resilient force of the return spring. The first hydraulic pressure is set in the vicinity of hydraulic pressure that is equivalent to the resilient force of the return spring. The second hydraulic pressure is set in the vicinity of hydraulic pressure that is equivalent to a minimum hydraulic pressure needed for engagement of the frictional element under a maximum load condition.

The first hydraulic pressure may be set at the hydraulic pressure that is equivalent to the resilient force of the return spring. The second hydraulic pressure may be set at the hydraulic pressure that is equivalent to the minimum hydraulic pressure needed for engagement of the frictional element under the maximum load condition.

The hydraulic pressure detecting means includes a first hydraulic pressure switch and a second hydraulic pressure switch. The first hydraulic pressure switch outputs an ON/OFF signal relative to the first hydraulic pressure as a threshold. The second hydraulic pressure switch outputs an ON/OFF signal relative to the second hydraulic pressure as a threshold.

BRIEF DESCRIPTION OF THE DRAWINGS

The above and other objects, features and advantages of the present invention will become more apparent from the following detailed description made with reference to the accompanying drawings. In the drawings:

FIG. 3 is a table showing a relationship between a combination of ON/OFF-conditions of the pressure switches and combined resistance of the resistances according to the embodiment;

FIG. 4A is a cross-sectional side view showing the pressure switch in the OFF-condition, and FIG. 4B is a cross-sectional side view showing the pressure switch in the ON-condition according to the embodiment;

DETAILED DESCRIPTION OF PREFERRED EMBODIMENTS

First Embodiment

Figure 1:
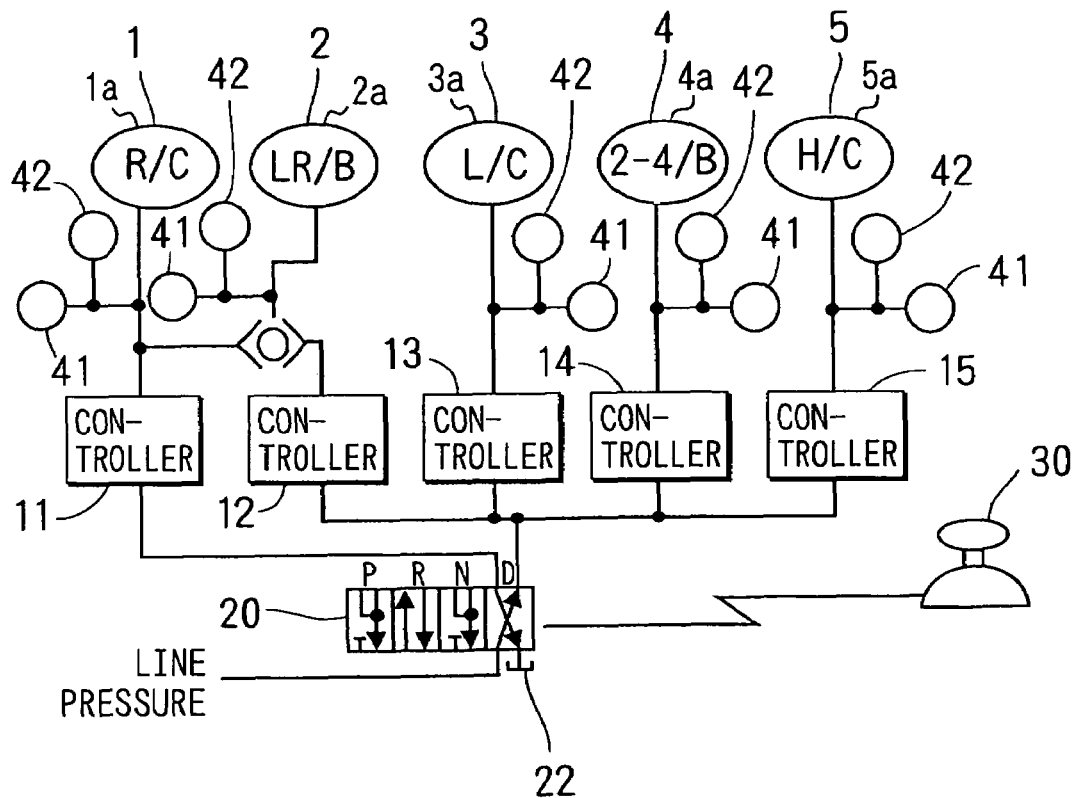
FIG. 1 is a diagram showing a hydraulic circuit of an automatic transmission control apparatus according to an embodiment of the present invention.

As shown in FIG. 1, an automatic transmission control system includes hydraulic pressure switches 41, 42 that detect hydraulic pressure applied to frictional elements 1 to 5. The pressure switches 41, 42 serve as hydraulic pressure detecting means. Each of the pressure switches 41, 42 respectively has a threshold, on which the pressure switch 41, 42 turns ON as hydraulic pressure detected by the pressure switch 41, 42 changes. The threshold of the pressure switch 41 is different from the threshold of the pressure switch 42. The pressure switches 41, 42 have substantially equivalent structures excluding the threshold.

As shown in FIG. 4A, terminals 100, 102 are not electrically continuous with each other, when hydraulic pressure applied to a diaphragm 104 is less than a detecting hydraulic pressure, i.e., the threshold. As shown in FIG. 4B, the terminals 100, 102 become electrically continuous with each other, when hydraulic pressure applied to the diaphragm 104 is greater than the threshold. Therefore, the hydraulic pressure switch 41 turns OFF, when hydraulic pressure applied to the frictional elements 1 to 5 is less than the threshold. Besides, the hydraulic pressure switch 41 turns ON, when hydraulic pressure applied to the frictional elements 1 to 5 is greater than the threshold.

The first oil pressure (first hydraulic pressure) P1, which is a threshold set for the pressure switch (low-pressure switch) 41, is set at hydraulic pressure that is equivalent to resilient force of each of return springs 1a to 5a. Each return spring 1a to 5a urges each frictional element 1 to 5 in the disengagement direction, in which the frictional element 1 to 5 is released from an engagement condition. The first hydraulic pressure P1 may be set in the vicinity of the hydraulic pressure that is equivalent to the resilient force of the return spring 1a to 5a. On the contrary, the second oil pressure (second hydraulic pressure) P2, which is detected by the pressure switch (high-pressure switch) 42, is set at hydraulic pressure that is equivalent to the minimum hydraulic pressure needed for engagement of the frictional element under the maximum load condition. The second hydraulic pressure P2 may be set in the vicinity of the hydraulic pressure that is equivalent to the minimum hydraulic pressure needed for engagement of the frictional element under the maximum load condition.

Figure 2:
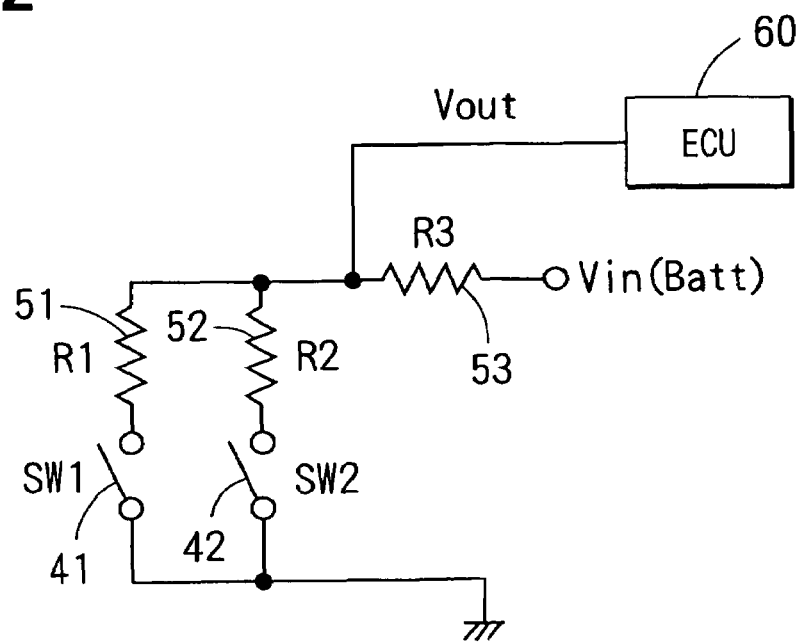
FIG. 2 is a diagram showing a circuit that includes pressure switches and resistances according to the embodiment.

As shown in FIG. 2, the low-pressure switch 41 and the high-pressure switch 42, which detect hydraulic pressure applied to each frictional element, construct a parallel circuit with resistances 51, 52. The low-pressure switch 41 and the resistance 51 are connected in series, and the high-pressure switch 42 and the resistance 52 are connected in series in the parallel circuit.

As shown in FIG. 3, combined resistance of the parallel circuit changes in four degrees based on the ON/OFF conditions of the low-pressure switch 41 and the high-pressure switch 42. Output voltage Vout of the parallel circuit varies in accordance with the combined resistance of the parallel circuit. The combined resistance of the parallel circuit changes based on the ON/OFF conditions of the low-pressure switch 41 and the high-pressure switch 42. An engine control unit (ECU) 60 detects the ON/OFF conditions of the pressure switches 41, 42 in accordance with the ratio Vout/Vin between the output voltage Vout and the power-supply voltage Vin to determine a failure. The ECU 60 serves as a failure determining means.

Next, a dual-engagement, which arises when a gear position is changed from the second gear to the third gear in the D range, is described.

Figure 5:
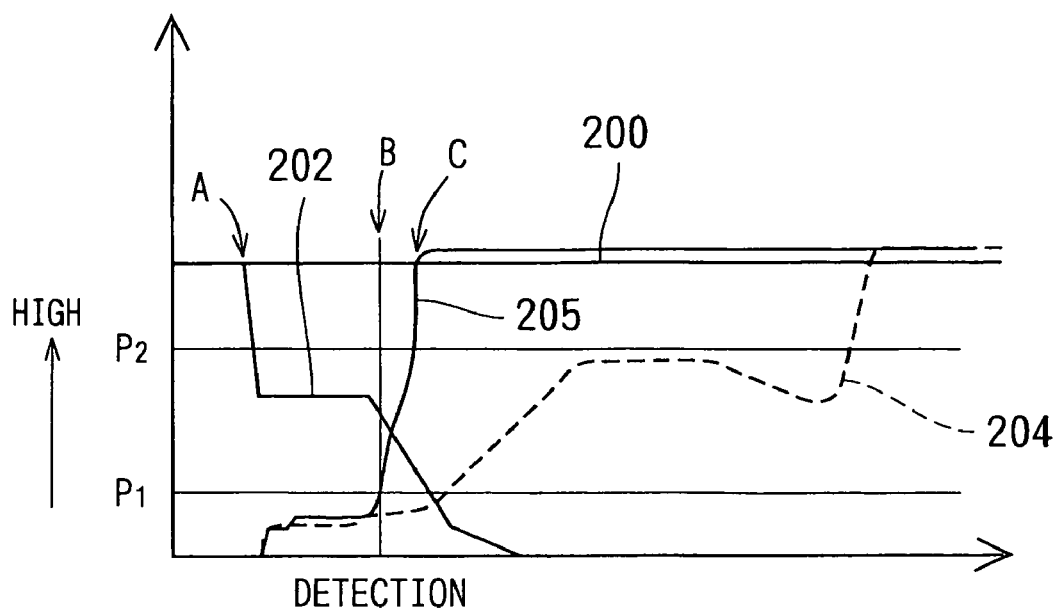
FIG. 5 is a time chart showing hydraulic pressure applied to frictional elements when a failure arises on the side of engagement according to the embodiment.
Figures 7, 8:
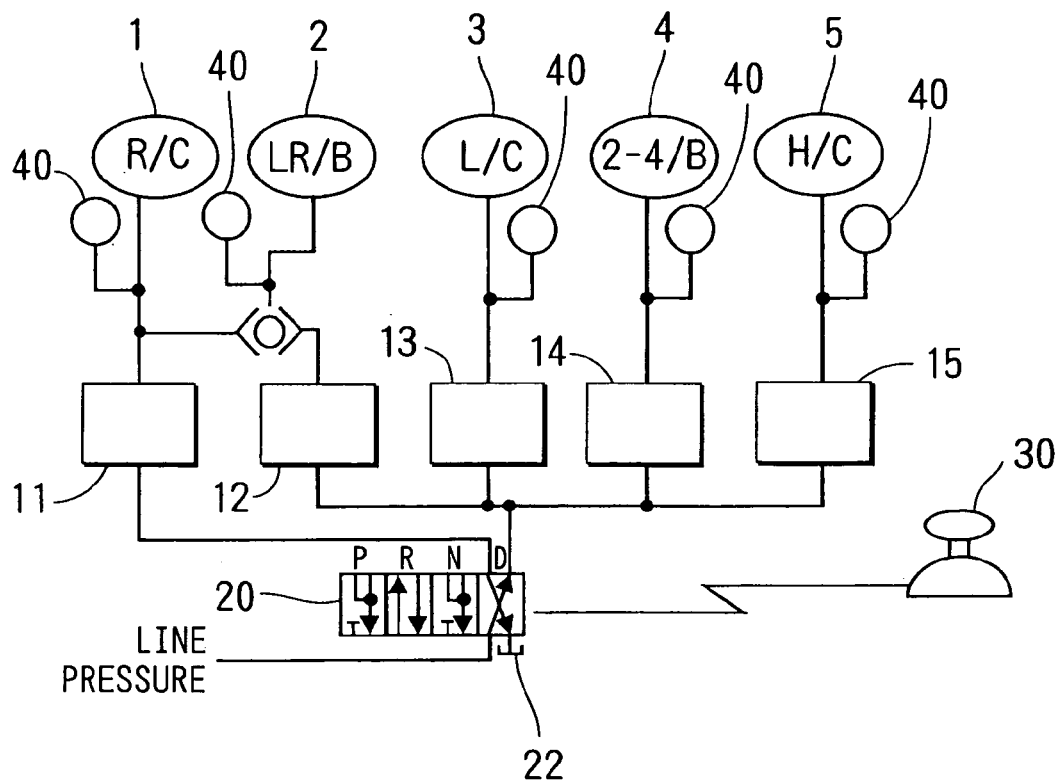
FIG. 7 is a diagram showing a hydraulic circuit of an automatic transmission control apparatus according to a prior art.
FIG. 8 is a table showing a relationship between engagement conditions of the frictional elements and drive modes according to the embodiment and a related art.
Figure 9:
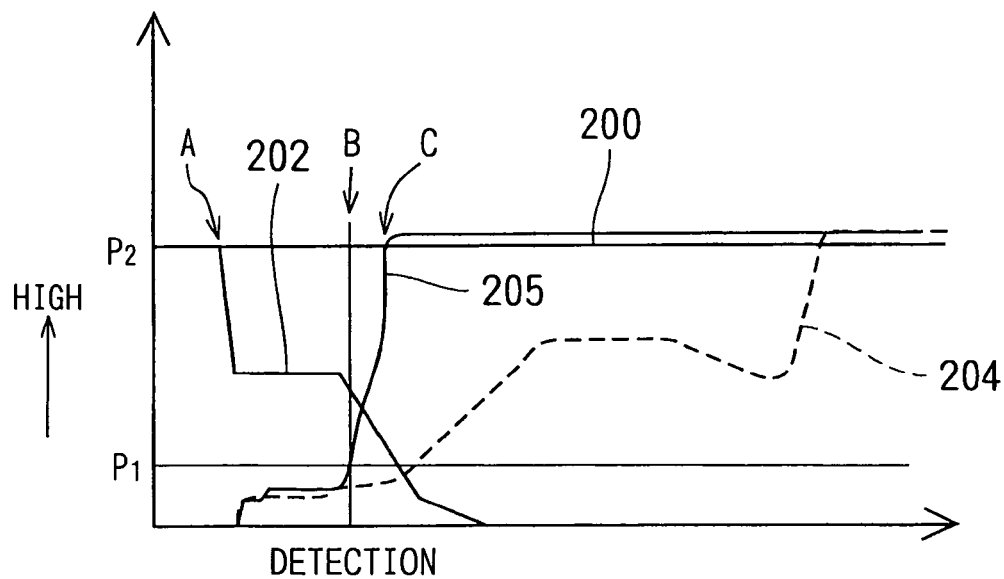
FIG. 9 is a time chart showing hydraulic pressure applied to frictional elements when a failure arises on the side of engagement according to the prior art.

As shown in FIGS. 5, 8, the gear is changed on the point A in FIG. 5. Hydraulic pressure 205 applied to an H/C 5 increases faster than a predetermined speed, and the low-pressure switch 41, which detects the hydraulic pressure 205 of the H/C 5 on the low-pressure side (first hydraulic pressure P1), is turned ON, on the point B in FIG. 5. In this condition, the low-pressure switch 41, which detects hydraulic pressure 202 applied to a 2-4/B 4 on the low-pressure side (first hydraulic pressure P1), is still turned ON, on the point B in FIG. 5. Therefore, the ECU 60 determines the 2-4/B 4 and the H/C 5 to be causing a dual-engagement. When the hydraulic pressure 205 increases over the first hydraulic pressure P1 on the point B in FIG. 5, and the high-pressure switch 42, which detects the hydraulic pressure 202 on the second hydraulic pressure P2, is still turned ON on the point B in FIG. 5, the dual-engagement may be determined.

Figure 6:
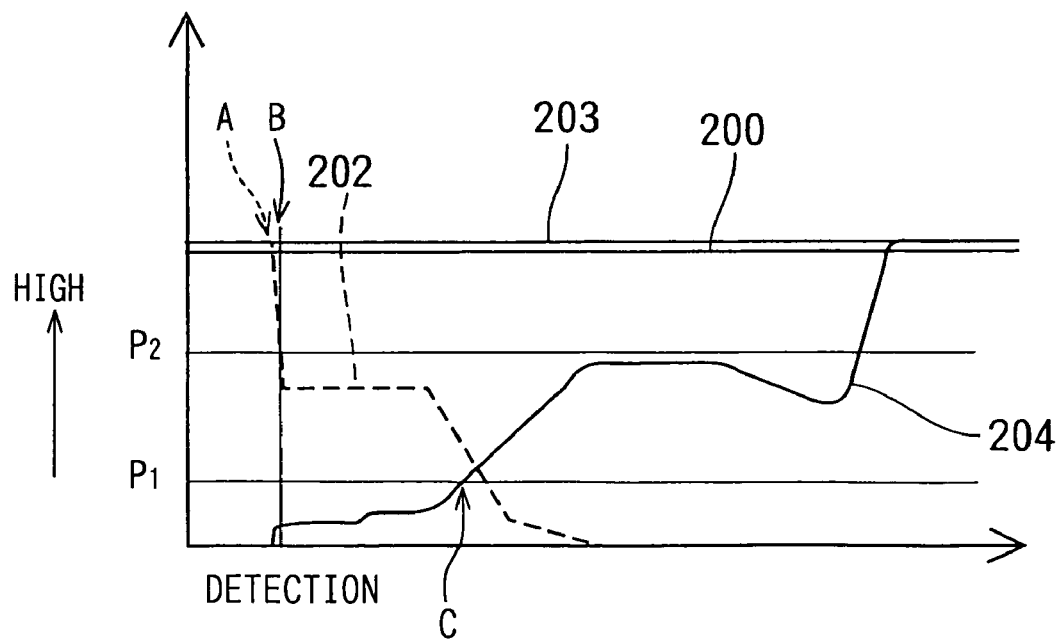
FIG. 6 is a time chart showing hydraulic pressure applied to the frictional elements when a failure arises on the side of disengagement according to the embodiment.
Figure 10:
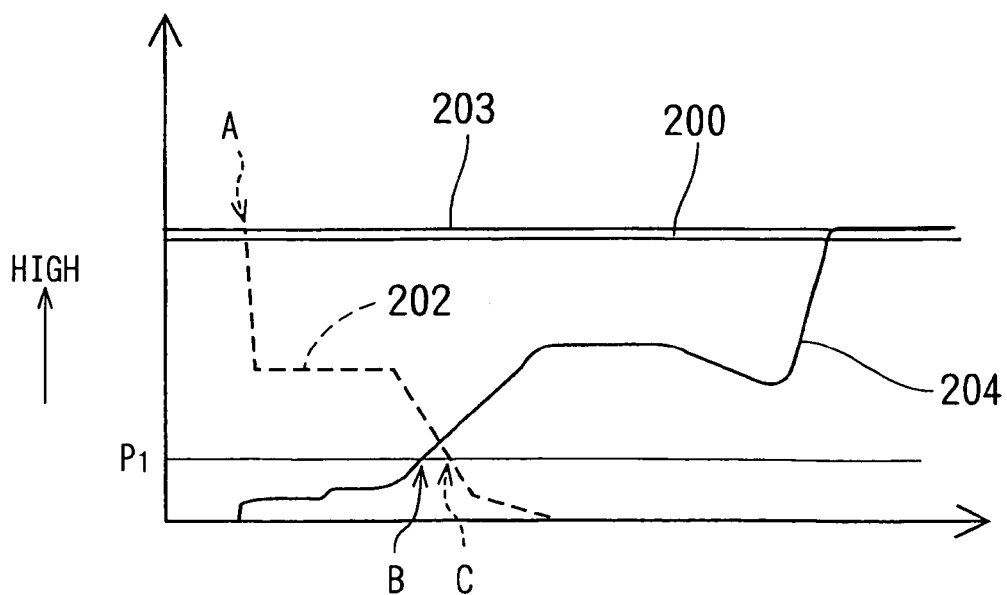
FIG. 10 is a time chart showing hydraulic pressure applied to the frictional elements when a failure arises on the side of disengagement according to the prior art.

As shown in FIGS. 6, 8, when the gear position is changed from the second gear to the third gear in the D range, the 2-4/B 4 may not be released, i.e., hydraulic pressure 203 applied to the 2-4/B 4 may be maintained high. In this situation, the high-pressure switch 42, which detects hydraulic pressure 203 of the 2-4/B 4 on the high-pressure side (second hydraulic pressure P2), is determined to be still ON. Thereby, a dual engagement can be prevented by setting a predetermined time to a timer or the like, before hydraulic pressure 204 applied to the H/C 5 increases over the first hydraulic pressure P1 and the low-pressure switch 41 is turned ON on the point C in FIG. 10.

Specifically, when the gear position is changed from the second gear to the third gear in the D range on the time point A in FIG. 6, the timer starts. The hydraulic pressure applied to the 2-4/B 4 is supposed to decrease as shown by the hydraulic pressure 202, and is supposed to be lower than the second hydraulic pressure P2 on the time point B in FIG. 6. However, when a predetermined time is elapsed after the timer starts, and the hydraulic pressure 203 is maintained higher than the second hydraulic pressure P2 on the time point B, the ECU 60 determines the hydraulic pressure 203 of the 2-4/B 4 to be in a failure condition. If the 2-4/B 4 is maintained high, the hydraulic pressure 204 of the H/C 5 increases over the first hydraulic pressure P1 on the time point C, on which the H/C 5 engages, and thus, the 2-4/B 4 and the H/C 5 causes a dual engagement. On the contrary, when the failure of the hydraulic pressure 203 of the 2-4/B 4 is detected on the point B, the dual engagement can be prevented on the point B.

In the above structure, hydraulic pressure applied to each frictional element is detected on both the high-pressure side and the low-pressure side using the two pressure switches 41, 42. Therefore, failure of hydraulic pressure applied to each frictional element can be determined on both the engagement side and the disengagement side, while the gear position is being changed. Thus, various kinds of failure modes can be determined.

In the above structure, a frictional element such as R/C 1 does not cause a dual-engagement. However, hydraulic pressure applied to the R/C 1 is detected using both the low-pressure switch 41 and the high-pressure switch 42. In this case, the threshold of the high-pressure switch 42, which is set on the high-pressure side, can be set higher than the minimum hydraulic pressure needed for engagement of the frictional element under the maximum load condition. Here, the frictional element, which is supposed to be engaged under the maximum load condition, may slip due to insufficient hydraulic pressure. However, the slipping condition of the frictional element can be detected by setting the threshold of the high-pressure switch 42.

In the above structure, the first hydraulic pressure P1 is set at the hydraulic pressure that is equivalent to the resilient force of the return spring. The second hydraulic pressure P2 is set at hydraulic pressure that is equivalent to the minimum hydraulic pressure needed for engagement of the frictional element under the maximum load condition. When hydraulic pressure of a frictional element exceeds the first hydraulic pressure P1, i.e., the resilient force of the return spring, the frictional element is supposed in the engagement condition. When a drive mode is changed, and hydraulic pressure of one frictional element is maintained higher than the second hydraulic pressure P2 for a predetermined period, failure of the hydraulic pressure of the frictional element can be detected, while hydraulic pressure of another of the frictional elements is less than the first hydraulic pressure P1. Therefore, failure of hydraulic pressure of each frictional element can be detected before frictional elements cause a dual-engagement.

In the above structure, the second hydraulic pressure P2 may be set at hydraulic pressure that is higher than the minimum hydraulic pressure needed for engagement of the frictional element under the maximum load condition. In this case, the transmission is controlled under hydraulic pressure, which is lower than the second hydraulic pressure P2, in all kinds of drive modes. Therefore, a failure, in which hydraulic pressure does not properly decrease lower than a set value, i.e., the second hydraulic pressure P2, can be steadily detected.

In the above structure, the pressure switches 41, 42 are ON/OFF switches that are operated in accordance with hydraulic pressure. Therefore, the structure of the pressure switches 41, 42, i.e., the hydraulic pressure detecting means is simple.

In the above structure, the high-pressure switch (second hydraulic pressure switch) 42 detects pressure of engagement of a frictional element, which is to be disengaged, while the gear position is being changed. Besides, the low-pressure switch (first hydraulic pressure switch) 41 detects pressure of engagement of another of the frictional elements, which is to be engaged, while the gear position is being changed. When both the high-pressure switch 42 of the frictional element, which is to be disengaged, and the low-pressure switch 41 of the frictional element, which is to be engaged, are turned ON, the ECU 60 (failure determining means) determines a dual-engagement to be caused. Thus, a dual-engagement can be steadily detected, while mistake of determination is restricted.

In the above structure, a combination of the ON/OFF conditions of the pressure switches 41, 42 are detected in accordance with the output voltage Vout of the parallel circuit. The output voltage Vout of the parallel circuit changes based on the combined resistance of the parallel circuit constructed of the pressure switches 41, 42 and the resistances 51, 52. Thereby, the number of the signal wires, which is connected to the ECU 60 for detecting the combinations of ON/OFF conditions of the pressure switches 41, 42, can be reduced to one. Thus, the number of the signal wires is reduced, and a wiring process of the signal wire can be simplified. Besides, ON/OFF conditions of both the low-pressure switch 41 and the high-pressure switch 42 can be detected using a circuit having a simple structure.

Other Embodiment

The hydraulic pressure detecting means may detect hydraulic pressure applied to each frictional element based on at least three kinds of thresholds of hydraulic pressure. The at least three kinds of thresholds of hydraulic pressure are different from each other.

The first hydraulic pressure P1 is not limited to be set at the hydraulic pressure that is equivalent to the resilient force of the return spring. The second hydraulic pressure P2 is not limited to be set at hydraulic pressure that is equivalent to the minimum hydraulic pressure needed for engagement of the frictional element under the maximum load condition. The first and second hydraulic pressure P1, P2 may be set to be in another range, as appropriate.

As referred to FIG. 6, when the hydraulic pressure 204 reaches the first hydraulic pressure P1, and both the pressure switches 41, 42 are turned ON, the hydraulic pressure may be determined to be in a failure condition, instead of using the timer for restricting a dual-engagement in the above structure.

The two pressure switches 41, 42 may be provided to only frictional elements that may cause a dual-engagement.

The output signals of the pressure switches 41, 42 may be directly connected to the ECU 60 to detect the combinations of the ON/OFF conditions of the pressure switches 41, 42, instead of using the parallel circuit in the above structure.

Various modifications and alternations may be diversely made to the above embodiments without departing from the spirit of the present invention.

What is claimed is:

1. An automatic transmission control apparatus for controlling a gear position by operating engagement and disengagement of a plurality of frictional elements, the automatic transmission control apparatus comprising:

first low-pressure detecting means for detecting first hydraulic pressure, which is applied to one of the plurality of frictional elements, to output a first-low signal by comparing the first hydraulic pressure with a first-low threshold; and first high-pressure detecting means for detecting the first hydraulic pressure, which is applied to the one of the plurality of frictional elements, to output a first-high signal by comparing the first hydraulic pressure with a first-high threshold;

wherein the first-high threshold is greater than the first-low threshold;

the automatic transmission control apparatus further comprising:

failure determining means for determining a failure in the plurality of frictional elements in accordance with the first-low signal and the first-high signal;

second low-pressure detecting means for detecting second hydraulic pressure, which is applied to another one of the plurality of frictional elements, to output a second-low signal by comparing the second hydraulic pressure with a second-low threshold; and second high-pressure detecting means for detecting the second hydraulic pressure, which is applied to said another one of the plurality of frictional elements, to output a second high signal by comparing the second hydraulic pressure with a second-high threshold;

wherein the second-high threshold is greater than the second-low threshold, said one of the plurality of frictional elements and said another one of the plurality of frictional elements are probable of causing a dual-engagement, and the failure determining means determines occurrence of the dual-engagement in accordance with the first-low signal, the first-high signal, the second-low signal, and the second-high signal.

2. The automatic transmission control apparatus according to claim 1,
wherein each of the plurality of frictional elements includes a return spring that generates resilient force biasing the frictional element in a direction in which the frictional element is released from an engagement condition, and
the frictional element engages when hydraulic pressure applied to the frictional element is greater than the resilient force of the return spring.

3. The automatic transmission control apparatus according to claim 1, wherein the dual-engagement occurs when said one of the plurality of frictional elements and said another one of the plurality of frictional elements simultaneously engage.

4. The automatic transmission control apparatus according to claim 1,
wherein each of the plurality of frictional elements includes a return spring that generates resilient force biasing the frictional element in a direction in which the frictional element is released from an engagement condition,
the first-low threshold is in the vicinity of the resilient force of the return spring of said one of the plurality of frictional elements,
the first-high threshold is in the vicinity of a minimum hydraulic pressure needed for engagement of said one of the plurality of frictional elements under a maximum load condition,
the second-low threshold is in the vicinity of the resilient force of the return spring of said another one of the plurality of frictional elements, and
the second-high threshold is in the vicinity of a minimum hydraulic pressure needed for engagement of said another one of the plurality of frictional elements under the maximum load condition.

5. The automatic transmission control apparatus according to claim 4,
wherein the first-high threshold is higher than the minimum hydraulic pressure needed for engagement of said one of the plurality of frictional elements under the maximum load condition, and
the second-high threshold is higher than the minimum hydraulic pressure needed for engagement of said another one of the plurality of frictional elements under the maximum load condition.

6. The automatic transmission control apparatus according to claim 4,
wherein the first-low threshold is equivalent to the resilient force of the return spring of said one of the plurality of frictional elements,
the first-high threshold is equivalent to the minimum hydraulic pressure needed for engagement of said one of the plurality of frictional elements under the maximum load conditions, the second-low threshold is set to be equivalent to the resilient force of the return spring of said another one of the plurality of frictional elements, and
the second-high threshold is set to be equivalent to the minimum hydraulic pressure needed for engagement of said another one of the plurality of frictional elements under the maximum load condition.

7. The automatic transmission control apparatus according to claim 1,
wherein the first low-pressure detecting means is a first low-pressure switch for outputting a first low ON/OFF signal by comparing the first hydraulic pressure with the first-low threshold, and
the first high-pressure detecting means is a first high-pressure switch for outputting a first high ON/OFF signal by comparing the first hydraulic pressure with the first-high threshold.

8. The automatic transmission control apparatus according to claim 7,
wherein the first low-pressure switch and the first high-pressure switch are arranged in parallel to construct a parallel circuit, and
the failure determining means determines an ON/OFF condition of the first low-pressure switch and an ON/OFF condition of first high pressure switch in accordance with combined resistance of the parallel circuit.

9. The automatic transmission control apparatus according to claim 7,
the first low-pressure switch outputs the first low ON/OFF signal when detecting the first hydraulic pressure being greater than the first-low threshold, and
the first high-pressure switch outputs the first high ON/OFF signal when detecting the first hydraulic pressure being greater than the first-high threshold.

10. The automatic transmission control apparatus according to claim 8,
wherein the second low-pressure detecting means is a second low-pressure switch for outputting a second low ON/OFF signal by comparing the second hydraulic pressure with the second-low threshold,
the second high-pressure detecting means is a second high-pressure switch outputting a second high ON/OFF signal by comparing the second hydraulic pressure with the second-high threshold,
wherein the failure determining means determines a dual-engagement in a condition where a gear position is being changed and by achieving both of the following conditions:
the first high-pressure switch detects the first hydraulic pressure applied to said one of the plurality of the frictional elements to be equal to or greater than the first-high threshold in a condition where said oone of the plurality of the frictional elements is to be released from an engagement condition; and
the second low-pressure switch detects the second hydraulic pressure applied to said another one of the plurality of the frictional elements to be equal to or greater than the second-low threshold in a condition where said another one of the plurality of the frictional elements is to be engaged.

11. The automatic transmission control apparatus according to claim 8, wherein the second low-pressure detecting means is a second low-pressure switch for outputting a second low ON/OFF signal by comparing the second hydraulic pressure, which is applied to said another one of the plurality of frictional elements, with the second-low threshold, the second high-pressure detecting means is a second high-pressure switch for outputting a second high ON/OFF signal by comparing the second hydraulic pressure, which is applied to said another one of the plurality of frictional elements, with the second-high threshold, wherein the failure determining means determines a dual-engagement in a condition where a gear position is being changed by achieving both of the following conditions:

the first low-pressure switch detects the first hydraulic pressure applied to said one of the plurality of the frictional elements to be equal to or greater than the first-low threshold in a condition where said one of the plurality of the frictional elements is to be released from an engagement condition; and the second low-pressure switch detects the second hydraulic pressure applied to said another one of the plurality of the frictional elements to be equal to or greater than the second-low threshold in a condition where said another one of the plurality of the frictional elements is to be engaged.

12. The automatic transmission control apparatus according to claim 7, wherein the failure determining means determines the dual-engagement by achieving the following condition:

the first high-pressure switch detects the first hydraulic pressure applied to said one of the plurality of the frictional elements to be equal to or greater than the first-high threshold when a predetermined time is elapsed after starting of changing a gear position in a condition where said one of the plurality of the frictional elements is to be released from an engagement condition.

* * * * *